HENRY HORN.
Corder.
No. 4,909. Reissued May 21, 1872.
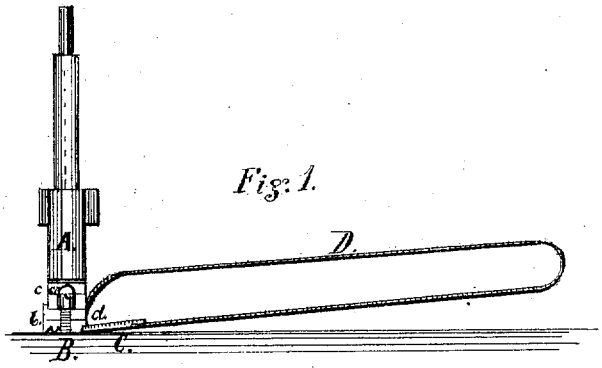
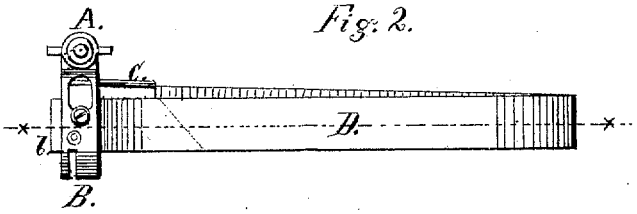
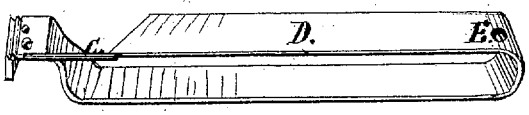
Witnesses:
F. E. Smith
John B. Button
Inventor:
Henry Horn
By J. B. Smith
his Att'y in fact
AM. PHOTO-LITHOGRAPHIC CO. N.Y. (OSBORNE'S PROCESS.)

UNITED STATES PATENT OFFICE.

HENRY HORN, OF FORT HOWARD, ASSIGNOR TO JOHN O. FAIRBAIRN, OF MILWAUKEE, WISCONSIN.

IMPROVEMENT IN CORDERS FOR SEWING-MACHINES.

Specification forming part of Letters Patent No. 112,810, dated March 21, 1871; reissue No. 4,909, dated May 21, 1872.

SPECIFICATION.

I, HENRY HORN, formerly of Milwaukee, in the county of Milwaukee and State of Wisconsin, now of Fort Howard, in the State of Wisconsin, have invented certain Improvements in "Cord-Guides for Sewing-Machines," of which the following is a specification:

*Nature and Objects of the Invention.*

My invention relates to an improvement in cord-guides; and it consists in constructing them of one piece of metal, and so combining and arranging them with the presser-foot as to make them all of one piece, or arranged so as to be fastened to the presser-foot with a screw, so as to make a more simple and reliable device, which is less liable to get out of order, and which does not require adjustment as those constructed of more than one piece frequently do.

*Description of the Drawing forming part of this Specification.*

Figure 1 is a sectional view of the improvement, as shown by line *x x*, Fig. 2. Fig. 2 is a plan view of my invention; and Fig. 3 a view of the bottom of the guide, showing a hole in the bow for the cord to pass through.

A is the presser-foot; B, the cord grooves or guide for the cord; C, the tube, through which the cord passes; D, the extension bow; E, hole in the bow, through which to pass the cord on its way to tube C. This hole keeps the cord out of the way of the work. *a*, a screw, by which the guide is attached to the presser-foot, which, when screwed up solid, makes the foot and guide one solid piece; *b*, an upward-projecting flange on the front side of the corder; *d*, a corresponding upward-curved form on the rear side, forming between the two sides a plain portion of the same width as the presser-foot.

This cord-guide is attached to the presser-foot, and, being made whole, requires no adjustment; the hole in the bow for the cord to pass through keeps the cord in a straight line.

I claim as my invention—

The trough-like shoe B, provided on its under side with grooves, and having projecting from it the spring-arm and cord-tube, all constructed in a single piece, and adapted to be secured to the presser-foot.

HENRY HORN.

Witnesses:
JOHN F. LESSEY,
ADA LESSEY.